J. G. KRICHBAUM.

BUCKET-EARS.

No. 7,183. Reissued June 20, 1876.

WITNESSES

Edd. J. Nottingham

Albert H. Bright.

INVENTOR

J. G. Krichbaum

By Leggett & Leggett.

Attorneys.

N. PETERS, PHOTO-LITHOGRAPHER, WASHINGTON, D. C.

UNITED STATES PATENT OFFICE.

JOHN GEORGE KRICHBAUM, OF YOUNGSTOWN, ASSIGNOR TO BARRETT, WATERS & LEWIS, OF CINCINNATI, OHIO.

IMPROVEMENT IN BUCKET-EARS.

Specification forming part of Letters Patent No. 89,666, dated May 4, 1869; reissue No. 7,183, dated June 20, 1876; application filed May 22, 1876.

*To all whom it may concern:*

Be it known that I, J. GEORGE KRICHBAUM, of Youngstown, in the county of Mahoning and State of Ohio, have invented certain new and useful Improvements in Bail-Ears; and I do hereby declare that the following is a full, clear, and exact description of the same, reference being had to the accompanying drawing, making part of this specifition, in which—

Figure 1:
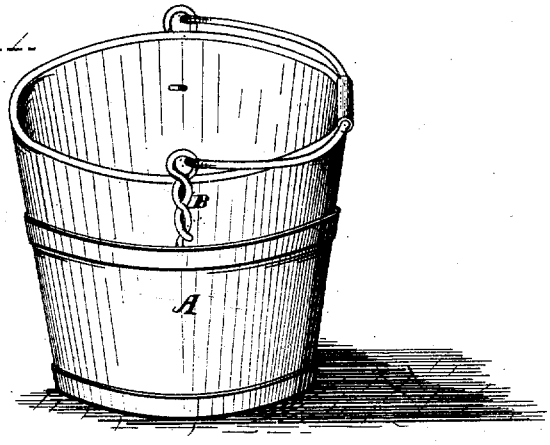
Figure 2:
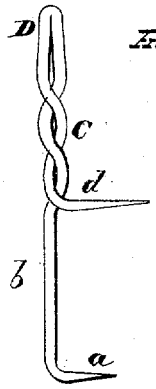

Figure 1 is a perspective view of a pail having my improved bail-ear attached thereto; and Fig. 2 is an enlarged view of the bail-ear as detached from the pail or other receptacle.

My invention relates to an improvement in bail-ears for pails, and other receptacles; and it consists in a bail-ear formed of a single piece of material, with two prongs located one above the other, which serve as the sole means for the attachment of the bail-ear to a pail or other receptacle, and a loop formed from the upper portion of the bail-ear for the attachment of the bail.

A represents a pail, to which the bail-ear B is secured. The bail-ear B is formed of a single strip of metal, the lower portion *a* being turned out at right angles to the body *b* of the ear, while the opposite end C is twisted to form a loop, D, and terminates in an upper prong, *d*, turned in the same direction as the lower prong *a*. The bail-ear is secured to the pail by driving the prongs through the sides of the pail, and then clinching the ends of the prongs against the inner surface of the pail or bucket, the lower one passing under the hoop.

The bail-ear, constructed as above set forth, is simple and economical in construction, as it requires no punching for the insertion of screws, as in ordinary bail-ears, and it is also complete in itself, and can be placed on the market as a finished article, ready for direct attachment.

Having fully described my invention, what I claim as new, and desire to secure by Letters Patent, is—

1. A bail-ear consisting of a single strip of material, the ends of which are bent at an angle to the body of the ear to form two prongs, located one above the other, and the upper portion of the ear formed into a loop for the attachment of the bail, substantially as set forth.

2. A bail-ear constructed with two prongs, located one above the other, and a loop, and formed of a single piece of material, substantially as and for the purpose set forth.

In testimony that I claim the foregoing I hereunto set my hand and seal this 16th day of May, 1876.

JOHN GEORGE KRICHBAUM. [L. S.]

Witnesses:

S. L. CLARK,

JOHN M. EDWARDS.